(12) United States Patent
Young

(10) Patent No.: US 6,243,767 B1
(45) Date of Patent: Jun. 5, 2001

(54) SYSTEM FOR REGISTER PARTITIONING IN MULTI-TASKING HOST ADAPTERS BY ASSIGNING A REGISTER SET AND A UNIQUE IDENTIFIER IN EACH OF A PLURALITY OF HARDWARE MODULES

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/089,013

(22) Filed: Jun. 2, 1998

(51) Int. Cl.[7] ................................................. G06F 12/06
(52) U.S. Cl. .................. 710/3; 710/129; 711/1; 711/202; 711/220
(58) Field of Search ..................... 710/127, 128, 710/129, 3, 9; 709/107, 104; 711/1–6, 202, 203, 209, 211, 220

(56) References Cited

U.S. PATENT DOCUMENTS

| | | | |
|---|---|---|---|
| 3,226,694 | * | 12/1965 | Wise .................................. 340/172.5 |
| 3,373,408 | * | 3/1968 | Ling .................................. 340/172.5 |
| 3,676,852 | * | 7/1972 | Abernathy et al. ............... 340/172.5 |

* cited by examiner

Primary Examiner—Thomas Lee
Assistant Examiner—Thuan Du
(74) Attorney, Agent, or Firm—Gunnison, McKay & Hodgson, L.L.P.; Forrest Gunnison

(57) ABSTRACT

An integrated circuit includes a sequencer module that executes firmware command lines and a plurality of hardware I/O bus interface modules. The plurality of hardware modules operates independently, and performs operations specified in a hardware I/O control block. Each of the plurality of hardware modules and receive data from and/or transmit data to an I/O bus. The sequencer module configures each hardware module by initializing a register set in each module, and monitors the operation of each module by polling the hardware register set. Each hardware module has a unique module identifier. Each register set has the same logical address space. A physical address of a particular register is the combination of the module identifier and the logical address of the register. Registers in two or more register sets that are used for the same operation, or function have the same logical address. This permits a single firmware routine to be used to service these modules for that function or operation. This reduces the number of command lines that are required

12 Claims, 4 Drawing Sheets

SYSTEM FOR REGISTER PARTITIONING IN MULTI-TASKING HOST ADAPTERS BY ASSIGNING A REGISTER SET AND A UNIQUE IDENTIFIER IN EACH OF A PLURALITY OF HARDWARE MODULES

BACKGROUND OF THE INVENTION

1. Field of the Invention

This invention relates to generally to host adapters for interfacing between I/O buses, and in particular to storage configurations in multi-tasking host adapters.

2. Description of Related Art

Prior single chip host adapters have been single task devices. For example, U.S. Pat. No. 5,659,690, entitled "Programmably Configurable Host Adapter Integrated Circuit Including a RISC Processor," issued on Aug.19, 1997 to Stuber et al., which is incorporated herein by reference, had a single data channel connecting a SCSI bus with a host computer bus. An on-chip RISC processor, sometimes called a sequencer, managed all of the modules on the chip through a set of registers.

This host adapter was multi-tasking in the sense that multiple commands, each for a different SCSI target, could be in process at any given time. However, hardware in the host adapter could execute only one task at a time, such as transferring data from one SCSI target to the host computer. The sequencer managed the one task until either completion or interruption of the task. Upon completion or interruption of the task, the sequencer disabled the hardware and then reconfigured the hardware for a different task.

Since the hardware on the host adapter chip could execute only one task at a time, the sequencer on the chip managed only the one active task at a time. Consequently, there were long periods of time in which the sequencer was idle and waiting for an event such as the end of the data transfer. While the sequencer was capable of performing other tasks, the hardware limitations made such performance unusable.

A subsequent host adapter integrated circuit had two independent data channels that were managed by a single sequencer. One of the data channels could be transferring data between the host computer and SCSI buses, while the other of the data channels could be transferring administrative data such as I/O command blocks, scatter/gather lists, or command completions notifications to or from the host computer. In this host adapter integrated circuit, rather than wait for an event associated with one of the two data channels, the sequencer waited in an idle loop for an event in either to the two data channels. This permitted the sequencer to concurrently supervise active tasks in both the channels, and to provide timely service when required.

In this host adapter integrated circuit, each channel had its own unique set of registers, and also shared a set of registers common to both channels. Each unique set of registers had its own logical address space. This required two different sets of firmware routines for the sequencer, one associated with each channel, for tasks that were common to both channels, e.g., data transfers. While this host adapter integrated circuit was an improvement over the earlier one, the unique register set for each channel limited the expansion of the architecture unless space on the chip was allocated for a larger address space, which in turn required a larger command line for the sequencer, and more storage space for the command lines themselves.

SUMMARY OF THE INVENTION

According to the principles of this invention, a novel register architecture and register partitioning method facilitate high-speed concurrent processing within an integrated circuit that interfaces a first input/output (I/O) bus with a second input/output bus. In one embodiment, the register partitioning method includes assigning a register set in each of a plurality of modules of the integrated circuit an identical set of logical addresses. Each module in the plurality of modules is assigned a unique module identifier. A physical address is generated for a register in one of the register sets by combining a logical address for the register and the unique module identifier for the module containing the register.

Since the same logical addresses are utilized for each of the register sets, the number of logical addresses required is reduced relative to an implementation, which assigned each register set a unique set of logical addresses. Since the number of required logical addresses is reduced, the number of bits required to address a register is also reduced. This reduces the number of bits in a processor command line that is required to specify a source register, a destination register, or a combination of source and destination registers. The reduction in the number of bits in the processor command line reduces the silicon area required for the on-chip processor.

Another aspect of this invention further reduces the silicon area associated with the on-chip processor. According to the principles of this invention, a logical address is assigned to a register in a first register set where the register in the first register set is utilized in a first operation performed by the module containing the first register set. The same logical address is assigned to a register in a second register set where the register in the second register set is utilized in a second operation performed by the module containing the second register set. Here, the first and second operations are the same operation. As used herein, "same operation" does not mean a single operation at an instant in time, but rather refers generically to a type of process, such as a DMA transfer or pointing to a memory storage location that is performed independently by each module.

Since the logical register address definitions for the operation in each module are the same only a single firmware routine is required to perform the operation in each module. Conversely, as described above, when each module had different logical register addresses, a separate firmware routine was required for each module where the routines differed only in the logical register addresses used.

The combination of the reduction in the command line size and the reduction in the number of lines of firmware reduces the on-chip storage area required for the firmware. The width of the storage area is the width of command line, and the depth of the area is proportional to the number of command lines in the firmware. Since this invention reduces both of these factors, the invention reduces the on-chip storage area required relative to the prior art host adapters while supporting enhanced multi-tasking functionality.

According to the principles of this invention, an integrated circuit includes a first I/O bus interface circuit having a first register set. The integrated circuit also includes a second I/O bus interface circuit having a second register set; and a sequencer module that generates a physical address using a mode identifier in a mode select register and a logical address. An address bus couples the physical address to the first and second register sets. In one embodiment, the integrated circuit is a host adapter integrated circuit and in another embodiment is an I/O bus bridge integrated circuit.

BRIEF DESCRIPTION THE DRAWINGS

Herein, elements with the same reference numeral are the same element.

DETAILED DESCRIPTION OF THE INVENTION

Figure 1:
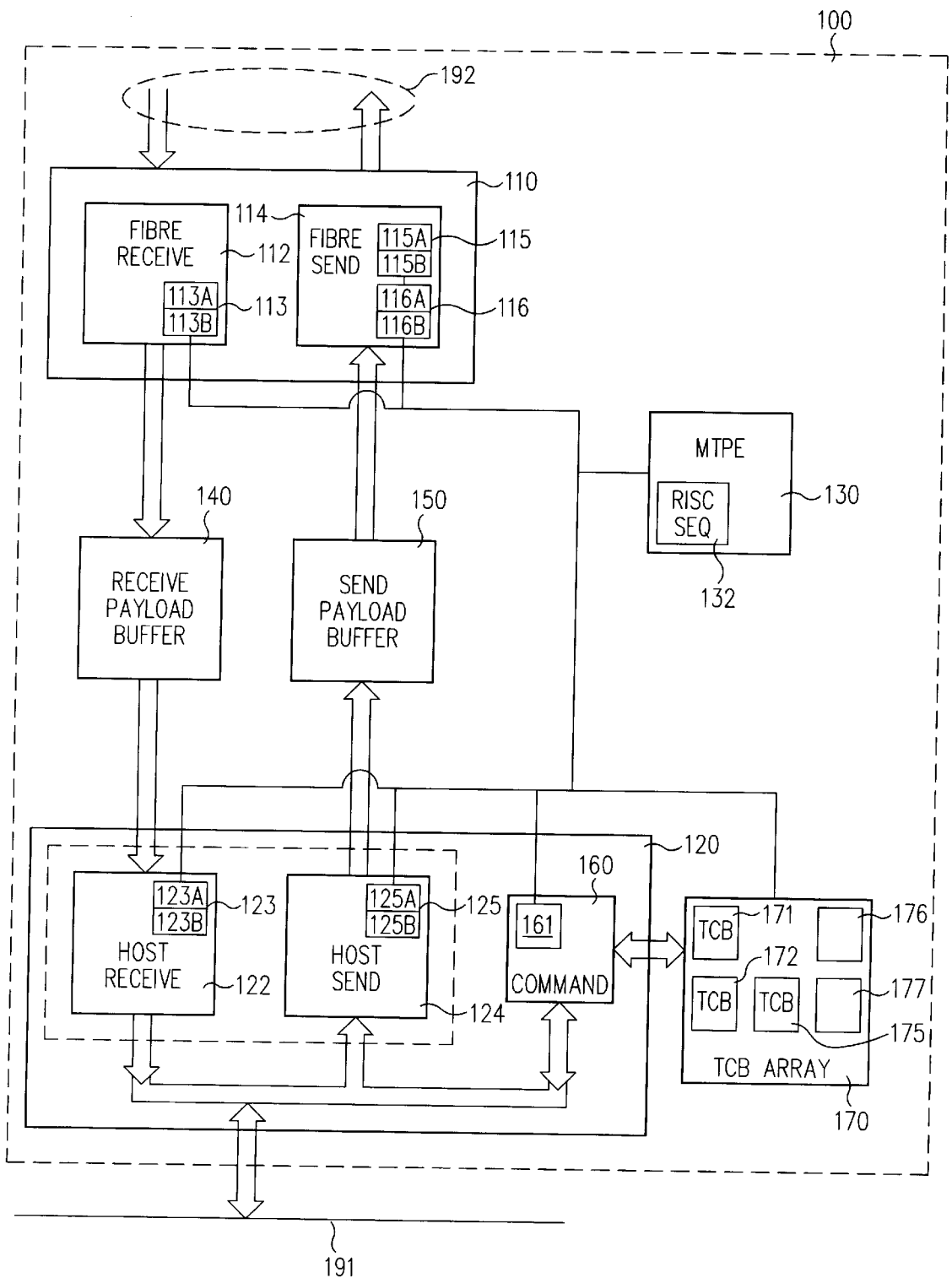
FIG. 1 is a block diagram of a host adapter integrated circuit that includes the novel register architecture of this invention.

According to the principles of this invention, a novel register architecture and register addressing method facilitate high speed concurrent processing within an integrated circuit host adapter 100, hereinafter host adapter 100, which interfaces a first input/output (I/O) bus 191, such as a PCI bus, with a second input/output bus, such as a Fibre Channel 192. In one embodiment, each of a plurality of modules 112, 114, 122, 124, and 160 in host adapter 100 includes a register set 113, 115 and 116, 123, 125 and 161, respectively that is accessed by a sequencer 132 in a multi-tasking protocol engine 130.

Each register set 113, 115 and 116, 123, 125 and 161 in the plurality of register sets has the same set of logical addresses, but a different set of physical addresses. The physical address for a particular register in a register set is a combination of a module identifier and a logical address of the register. Since the module identifier is different for each register set, this provides a unique physical address for each register in host adapter 100.

This addressing method and register architecture, for modules in a host adapter, have several advantages. First, the number of logical addresses required is reduced, which in turn reduces the number of bits required to address a register. For example, if each register set includes 32 registers and there are six modules, there are a total of 192 registers. If each of the 192 registers has a unique logical address, an 8-bit logical address is required. However, with this invention, only a 5-bit logical address is required to address the 192 registers in the logical address space.

The smaller logical address in turn reduces the number of bits in a command line that is required to specify the source and destination registers for a sequencer operation. This reduces the size of the storage required for sequencer firmware, and the size of the sequencer itself.

The number of lines of firmware required to manage the modules is also reduced by this invention. As explained more completely below, many of the operations performed by modules are equivalent, e.g., a DMA transfer task. Therefore, the same firmware routine is used for such a task, i.e., a task that is performed by two modules, in each of the different modules. Consequently, the logical register address definitions used by that task are the same for each of the modules that utilize the firmware routine. Conversely, as described above, when each module had different logical register addresses, a separate firmware routine was required for each module where the routines differed only in the logical register addresses used. Therefore, this invention greatly reduces the firmware required which in turn reduces the firmware storage requirements.

In this embodiment of the invention, host adapter 100 is an interface between PCI bus 191, e.g., a host computer I/O bus, and Fibre Channel 192. Host computer bus interface circuit 120 includes host receive module 122 with host receive module register set 123, host send module 124 with host send module register set 125, and a command module 160 with command module register set 161.

Host receive module 122 and host send module 124 transfer data to and from PCI bus 191, respectively. Host receive module register set 123 is configured by MTPE 130 to enable host receive module 122 to transfer data from receive payload buffer 140 to PCI bus 191, while host send module register set 125 is configured by MTPE 130 to enable host send module 124 to transfer data from PCI bus 191 to send payload buffer 150. During the data transfer, and after the data transfer, both modules 122 and 124 update status registers in module register sets 123 and 125, respectively.

MTPE 130 monitors these status registers and takes appropriate actions to service and manage modules 122 and 124. The particular actions taken by MTPE 130 and host receive and send modules 122 and 124 are not essential to this invention. An essential aspect is that each module includes a module register set, and registers within each module register set, which are used for the same function or operation, have the same logical addresses. Specifically, for example, registers 123A and 125A in host receive and send modules 122 and 124, respectively, are used for the same functions or operations, e.g., a DMA transfer, and so have the same logical addresses.

Command module 160 within host interface unit 120 also includes a command module register set 161. MTPE 130 configures command module register set 161 (i) to enable DMA transfers of transfer control blocks (TCBs) from host memory over PCI bus 191 to TCB array 170, (ii) to enable DMA transfers of Scatter/Gather list elements from host computer memory over PCI bus 191 to a cache memory for a TCB, and (iii) to enable DMA transfers of pointers to completed TCBs into a done queue in the host computer memory. Again, registers within command module register set 161 that are used for the same function or operations as registers in other modules have the same logical addresses.

Fibre receive module 112 includes a fibre receive module register set 113. Fibre receive module 112 handles incoming frames from Fibre Channel 192. Fibre receive module 112 passes frame payloads to receive payload buffer 140. Initially, MTPE 130 configures fibre receive module register set 113 to enable fibre receive module 112 to commence operation. MTPE 130 loads a TCB pointer register in fibre receive module register 113 with a pointer to a TCB in TCB array 170 that specifies the task performed by fibre receive module 112.

When a frame is received by fibre receive module 112, which is not for the current TCB as defined by value in the TCB pointer register in fibre receive module 112, fibre receive module 112 updates the status registers in register set 113 appropriately. MPTE 130 monitors the information in the status registers in register set 113 and services fibre receive module 112 as required.

Fibre send module 114 includes, in this embodiment, includes a first channel with a first fibre send module register set 115, and a second channel with a second fibre module register set 116. Each channel can operate independently, but only one channel at a time can access Fibre Channel 192. A channel in fibre send module 114 handles outgoing frames to Fibre Channel 192. A channel in fibre send module 114 retrieves data from send payload buffer 150 and creates payloads. The channel in fibre send module 114 attaches headers to the payloads and drives frames onto Fibre Channel 192.

Initially, MTPE 130 configures one of fibre send module register sets 115 and 116 to enable that channel in fibre send module 114 to commence operation. MTPE 130 loads a TCB pointer register in the selected fibre send module register set with a pointer to a TCB in TCB array 170 that specifies the task for that channel of fibre send module 114. Registers in fibre send module 114 that are used in performing operations that are equivalent to those performed by fibre receive module 112 have the same definitions. MPTE 130 monitors the information in the status registers and services each channel in fibre send module 114 as required.

Each of modules 112, 114, 122, 124, and 160 operates independently from each of the other modules. At a given point in time, each of modules 112, 114, 122, 124, and 160 can be executing a different task. As indicated above, the task executed by a module is specified by a TCB.

For example, when command module 160 is fetching elements from a scatter/gather list in the host computer memory, a TCB 171 includes information that specifies the host memory addresses of the elements, and information that defines which module firmware is to be executed after all the elements in the scatter/gather list are fetched. When host receive module 122 is transferring payload data from receive payload buffer 140 to the host computer using a DMA transfer, information in another TCB 172 specifies the scatter/gather list, which, in turn, specifies where to store the payload data in the host computer memory. At the same time that host receive module 122 is transferring data, fibre receive module 112 can be performing a task, e.g., transfer of data to receive payload buffer 140 that is specified by another TCB 175. Fibre send module 114 can simultaneously transfer data from send payload buffer 114 according to the specifications in two more TCBs 176 and 177.

Hence, one register in each module register set is a TCB pointer register. Each of the TCB pointer registers has the same logical address, but a different physical address. The TCB pointer register holds a pointer to a TCB, in TCB array 170, that provides the specification for the task currently being performed by the module.

The use of a TCB pointer register in each module is particularly advantageous in enhancing the performance of MPTE 130. If a single physical TCB pointer register were used, MPTE 130 would have to define the TCB pointer register each time MPTE 130 began execution of a routine for a different module. Specifically, MPTE 130 would have to save the contents of the register for the previous module, and then restore the contents of the register for the current module. This, in turn, would require allocation of scratch registers for each module, and firmware for saving and restoring the TCB pointers. The time required for save and restore operations, the scratch registers, the storage space for the additional code for save and restore operations, and the execution of the additional code are expensive.

The register architecture of this invention eliminates the need for all of these expensive items. As MPTE 130 moves from module to module, it is unnecessary to perform any operation to either save or restore the contents of the TCB pointer registers, or any other registers in the plurality of module register sets. To access the appropriate set of registers that includes the TCB pointer register, MPTE 130 loads a mode identifier into a mode select register. The logical address for the TCB pointer register in each of the modules is the same. Consequently, when the content of the mode select register is combined with the logical address for the TCB pointer register, the correct physical TCB pointer register is addressed. As MPTE 130 shifts from module to module, the contents of the six TCB pointer registers are neither saved to scratch memory nor restored from scratch memory.

Figure 2:
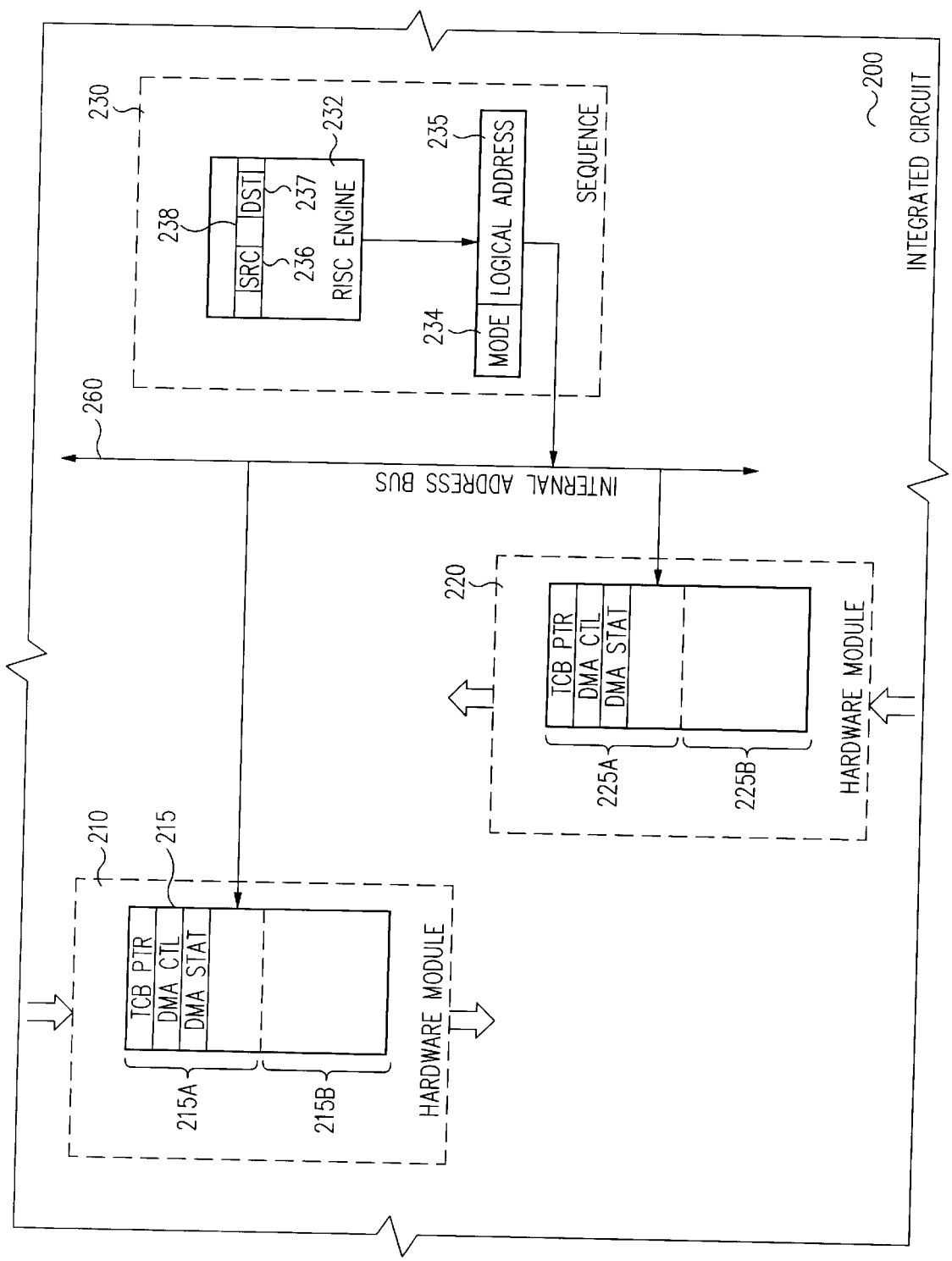
FIG. 2 is a more detailed block diagram of an integrated circuit that is an interface between two I/O buses, and that includes the novel register architecture of this invention.

FIG. 2 is a more detailed diagram of an integrated circuit that includes a sequencer module 230, which in this embodiment in turn includes a RISC module 232 that executes firmware command lines, and two hardware I/O bus interface modules 210 and 220, hereinafter, hardware modules 210 and 220. Each command line is loaded into command line register 238. Command lines that include operations that utilize a register, or registers in a module register set typically include a source register address 236 and a destination register address 237.

Hardware modules 210 and 220 are representative of modules such as those in integrated circuit host adapter 100, or alternatively in another integrated circuit such as a SCSI bus to multiple SCSI buses bridge integrated circuit, a Fibre Channel to multiple Fibre Channels bridge integrated circuit, or in general, an initiator to target bridge integrated circuit, and are used to illustrate the principles of this invention more clearly. Hardware modules 210 and 220 operate independently and perform operations specified in a hardware I/O control block, such as the TCB used in FIG. 1, and hereinafter as an example of a hardware control I/O block. Hardware modules 210 and 220 receive data from and transmit data to an I/O bus.

In this embodiment, sequencer module 230 configures hardware modules 210 and 220 by loading a TCB pointer in each TCB pointer register TCBPTR within module register set 215, and 225, respectively. The TCB that is addressed by the TCB pointer stored in the module register set carries instructions for that module. Sequencer module 230 also loads other registers in the register set as necessary to initialize that module for performing the operation or operations specified in the TCB. Typically, sequencer module 230 performs this initialization operation upon detecting a command, i.e., a new TCB, for execution.

Figure 3:
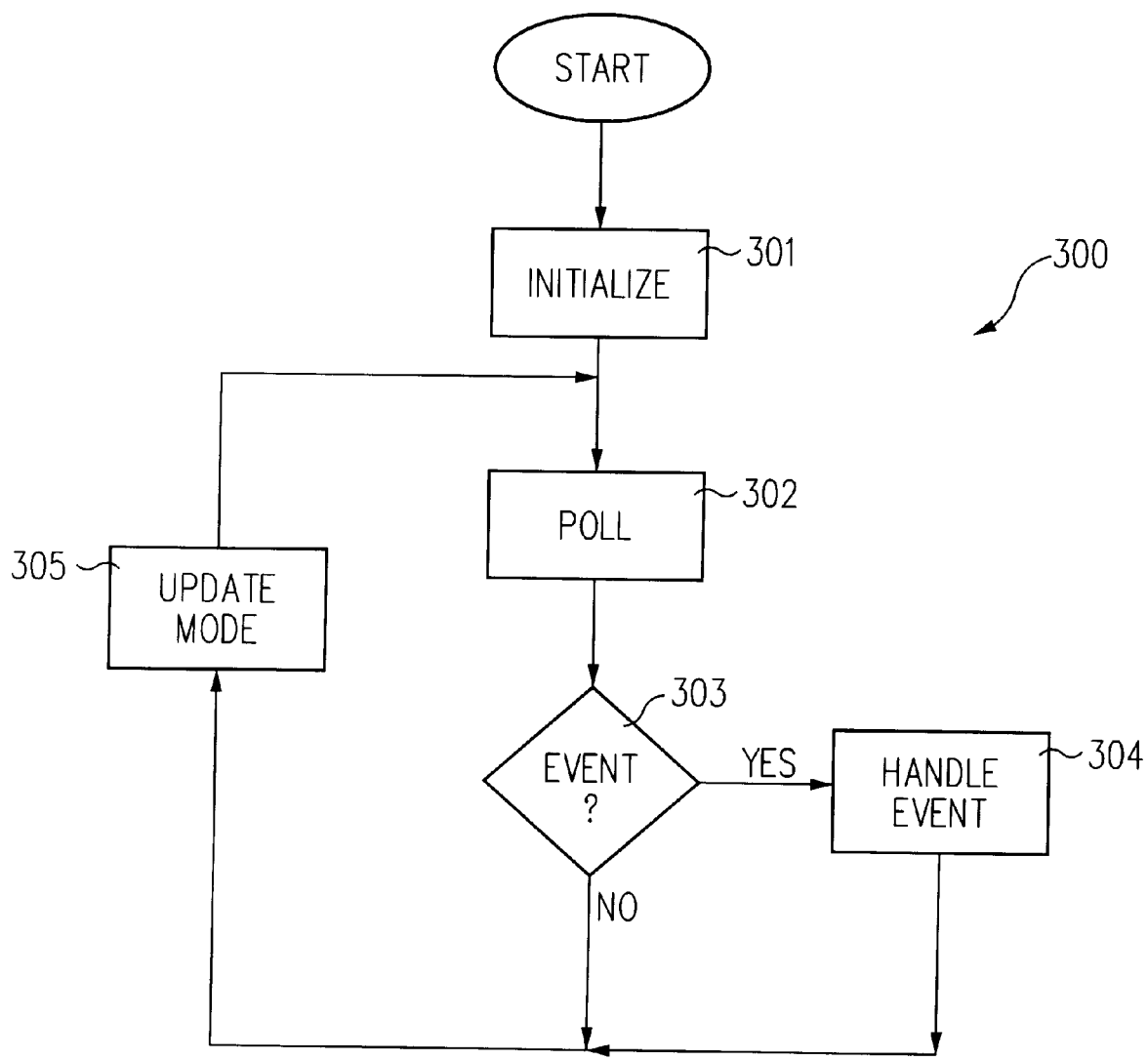
FIG. 3 is a process flow diagram for an idle loop of an on-chip sequencer that utilizes the novel register architecture of this invention.

Specifically, as illustrated in FIG. 3, RISC processor 232 executes an idle loop process 300 waiting for an event, e.g., a new activity event, or perhaps a completion of data transfer event. In idle loop 300, initially, a mode is set by loading mode select register 234 in initialize operation 301. Processing transfers from initialize operation 301 to poll operation 302.

In poll operation 302, RISC processor 232 polls the module having the mode specified in mode select register 234, e.g. module 210, and reads appropriate registers within the module register set, e.g., register set 215, to determine the status of module 210. To read one or more registers in register set 215, RISC processor 232 sequentially loads the logical address 235 for each register, that is read the combination of the mode identifier in mode select register 234 and logical address 235 defines the physical address of one register within register set 215. The physical address is driven on internal address bus 260 to each of hardware modules 210 and 220.

If RISC processor 232 determines that an event has occurred in module 210, event check 303 transfers processing to handle event operation 304, and otherwise transfers to update mode operation 305. Here it was assumed that all the registers are read, and then event checking is done. Those of skill in the art will appreciate that event checking could be done after each read of a register, or after reading some combination of registers. The particular sequence of polling and checking for events is not of importance in this invention. The important aspect is that RISC processor 232 determines whether an event has occurred in module 210. See for example, copending, commonly filed, and commonly assigned U.S. patent application Ser. No. 09/088,810, entitled "Execution Suspension and Resumption of Multitasking Host Adapters," of B. Arlen Young.

When processing transfers to handle event operation 304, RISC processor 232 branches to an appropriate location in the firmware based upon the mode, i.e., the value of the mode identifier loaded in mode select register 234, and the nature of the event. In handle event operation 304, RISC processor 232 executes the firmware for the event, and then transfers to update mode operation 305. Alternatively, the firmware for the event could update mode select register 234 and upon completion of handle event operation 304 transfer to poll operation 302. Similarly, if RISC processor 232 requires data from another module to handle the event, RISC processor 232 simply changes the mode identifier in mode select register 234, and obtains the data from the other module and then changes the mode identifier in mode select register 234 back to the module that had the event. As RISC processor 232 accesses registers in the different modules, RISC processor 232 does not perform any save or restore operations, but rather simply modifies the information in mode select register 234.

In update mode operation 305, RISC processor 232 updates the mode identifier in mode select register 234 for the next module, e.g., module 220, and transfers to poll operation 302. Poll operation 302 and event check 303 function as described above, and that description is incorporated herein by reference. Notice that in the shift to the next module, there was no saving of values in register set 215 of module 210 and no restoring of values in register set 225 of module 220. To access another module only the information in mode select register 234 is changed.

In one embodiment, the mode select register has a size of three bits, and modes 0 to 5 are defined. The. logical addresses are nine bits. In another embodiment, the mode select register is six bits in size. Three of the six bits are used to specify a source module, and the other three bits are used to specify a destination module. In each instance, registers 215A and 225A within register sets 215 and 225, respectively, which are used for the same operations, have the same logical addresses. Registers 215B and 225B within register sets 215, and 225, respectively, have logical addresses and definitions that are specific to the module containing the registers. In the embodiment illustrated in FIG. 2, the common register definitions within registers 215A and 225A include TCB pointer register TCBPTR, DMA control register DMACTL, and DMA status register DMASTAT.

Again, the particular definitions and uses of the registers with common definitions are not an essential feature of this aspect. The important aspect is that if two modules perform the same function or operation, the registers used in that function or operation are defined the same and given the same logical address in both modules. This permits a single firmware routine to be used to service both modules for that function or operation. This reduces the number of command lines that are required for RISC processor 232.

Also as previously pointed out, the use of the same logical address space for each module reduces the width of command line register 238 in comparison to an integrated circuit that requires a unique logical address space for each module. The combination of these two factors reduces the on-chip storage area required for the firmware of RISC processor 232. The width of the storage area is the width of command line register 238, and the depth of the area is proportional to the number of command lines in the firmware. Since this invention reduces both of these factors, the invention reduces the on-chip storage area required relative to the prior art host adapters while supporting enhanced multi-tasking functionality.

Figure 4:
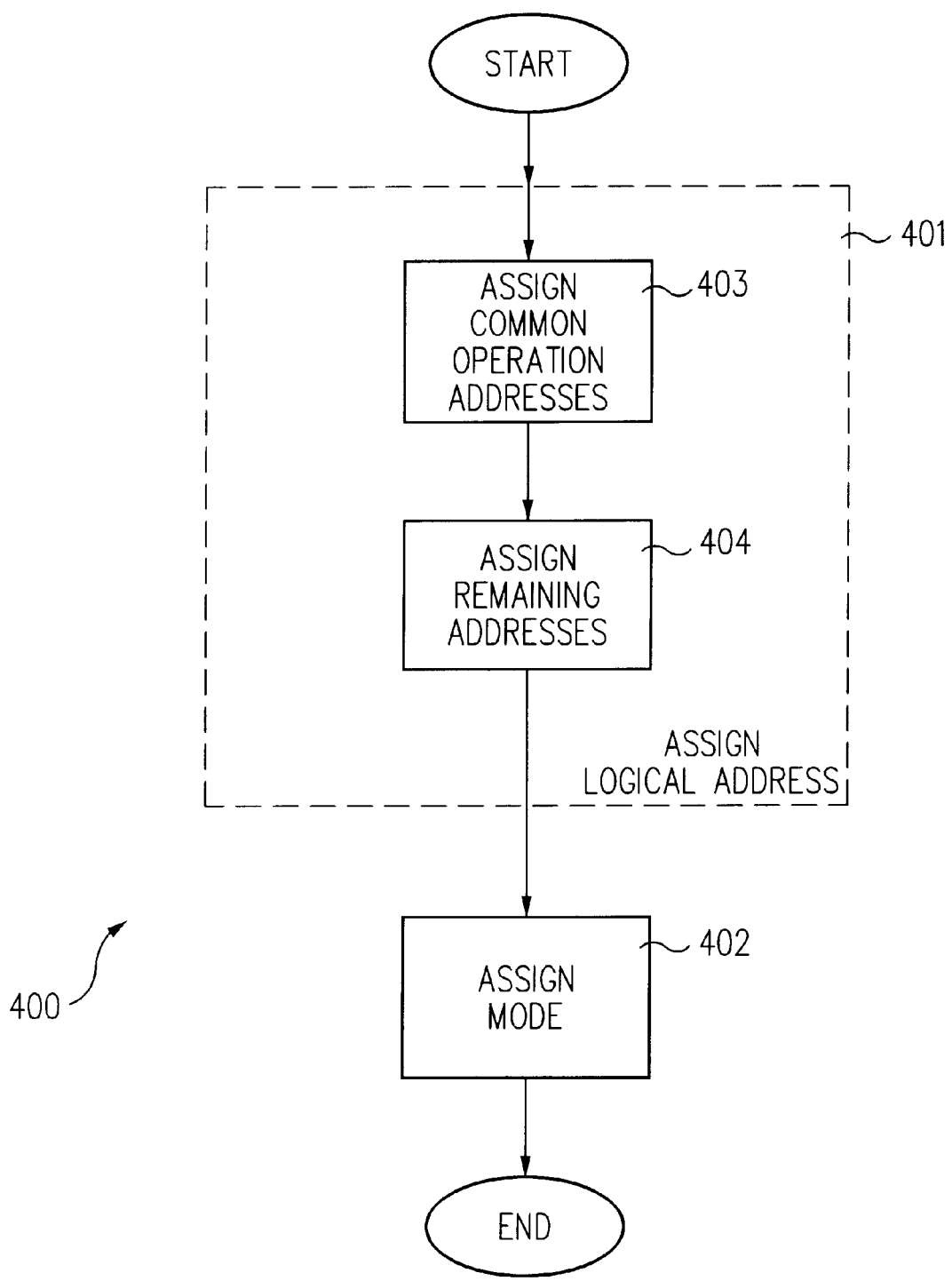
FIG. 4 is a process flow diagram for the method of register partitioning according to the principles of this invention.

FIG. 4 is a process flow diagram for the method of register partitioning according to the principles of this invention. As described above, this method reduces the logical address space, i.e., reduces the number of logical addresses, required by an I/O bus interface circuit that utilizes the invention.

In assign logical address operation 401, a register set in each of a plurality of modules of an integrated circuit interfacing two I/O buses is assigned an identical set of logical addresses. Within operation 401, registers within two or more modules in the plurality of modules that are used to perform the same function, or operation, e.g., a DMA transfer, are assigned the same logical addresses in assign common operation addresses 403. This assignment can be on a register by register basis as for the TCB pointer register described above, or on a register by register basis for a group of registers. After all the registers that are used for common functions or operations in the various modules are assigned logical addresses, the remaining logical addresses are assigned to the remaining registers in the register set in assign remaining addresses operation 404.

Assign local addresses operation 401 transfers to assign mode operation 402. In operation 402, each module or portion of a module that interfaces with an I/O bus and contains one of the register sets is assigned a unique mode identifier. With the assignments of operations 401 and 402, a unique physical address can be generated for each register in the register sets.

The embodiments of the invention described above are only illustrative of the invention and are not intended to limit the invention to the particular embodiments described. In view of this disclosure, those of skill in the art can utilize the invention in any integrated circuit that includes a plurality of modules that are used in interfacing two I/O buses; where the tasks performed by the modules are specified in I/O command blocks; and where the operations performed by the modules are controlled by an on-chip sequencer.

I claim:

1. A register partitioning method comprising:
   assigning a register set in each of a plurality of hardware modules of an integrated circuit interfacing two I/O buses, an identical set of logical addresses wherein each register set includes a different plurality of registers; and
   assigning each hardware module in said plurality of hardware modules a unique module identifier.

2. The method of claim 1 further comprising:
   generating a physical address for a register by combining a logical address for said register and said unique module identifier for the hardware module containing said register.

3. The method of claim 1 further comprising:
   assigning a logical address to a register in a first register set wherein said register in said first register set is utilized in a first operation performed by the hardware module containing said first register set.

4. The method of claim 3 further comprising:
   assigning said logical address to a register in a second register set wherein said register in said second register set is utilized in a second operation performed by the hardware module containing said second register set and further wherein said first and second operations are the same operation.

5. A method comprising:

using a different plurality of registers in each of a plurality of hardware modules in an integrated circuit, wherein said integrated circuit is an interface for transferring data between a first I/O bus and a second I/O bus;

using a common set of logical addresses for each of said different plurality of registers;

assigning each hardware module in said plurality of hardware modules a unique module identifier; and converting a logical address for one register in one hardware module in said plurality of hardware modules to a physical address by combining a logical address for said one register and the unique module identifier for said one hardware module in said plurality of hardware modules.

6. The method of claim 5 wherein said using a common set of logical addresses for each of said different plurality of registers further comprises:

assigning a logical address to a register in a first plurality of registers wherein said register in said first plurality of registers is utilized in a first operation performed by the hardware module containing said first plurality of registers; and assigning said logical address to a register in a second plurality of registers wherein said register in said second plurality of registers is utilized in a second operation performed by the hardware module containing said second plurality of registers wherein said first and second operations are the same operation.

7. The method of claim 5 wherein said integrated circuit is a host adapter integrated circuit.

8. The method claim 5 wherein said integrated circuit is an I/O bus bridge integrated circuit.

9. An integrated circuit comprising:

a first I/O bus interface circuit having a first register set;

a second I/O bus interface circuit having a second register set wherein said first and second register sets are different register sets;

a sequencer module having a physical address comprising information in a mode select register, and a logical address; and an address bus coupling said physical address to said first and second register sets.

10. The integrated circuit of claim 9 wherein said integrated circuit is a host adapter integrated circuit.

11. The integrated circuit of claim 9 wherein said integrated circuit is an I/O bus bridge integrated circuit.

12. The integrated circuit of claim 10 wherein said first I/O bus is a Fibre Channel.

* * * * *